(12) United States Patent
Mollett et al.

(10) Patent No.: US 7,664,687 B1
(45) Date of Patent: Feb. 16, 2010

(54) SYSTEM AND METHOD OF DETERMINING COLLECTABILITY IN A DISTRIBUTED NEGATIVE FILE

(75) Inventors: Cassandra J. Mollett, Houston, TX (US); Thomas E. Burnside, Cypress, TX (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 09/474,576

(22) Filed: Dec. 29, 1999

(51) Int. Cl.
G06Q 40/00 (2006.01)

(52) U.S. Cl. .............................. 705/35; 705/44; 705/45

(58) Field of Classification Search .................... 705/35, 705/37–39, 42, 44, 45
See application file for complete search history.

(56) References Cited

U.S. PATENT DOCUMENTS

| | | | | |
|---|---|---|---|---|
| 4,109,238 | A * | 8/1978 | Creekmore ................. | 340/5.8 |
| 4,187,498 | A * | 2/1980 | Creekmore ................. | 340/5.8 |
| 5,175,682 | A * | 12/1992 | Higashiyama et al. ........ | 705/45 |
| 5,262,941 | A * | 11/1993 | Saladin et al. ................ | 705/38 |
| 5,383,113 | A * | 1/1995 | Kight et al. ................... | 705/40 |
| 5,484,988 | A * | 1/1996 | Hills et al. .................. | 235/379 |
| 5,649,116 | A * | 7/1997 | McCoy et al. ............... | 395/238 |
| 5,679,940 | A * | 10/1997 | Templeton et al. .......... | 235/380 |
| 5,877,485 | A * | 3/1999 | Swartz ....................... | 235/383 |
| 6,029,154 | A * | 2/2000 | Pettitt .......................... | 705/44 |
| 6,038,553 | A * | 3/2000 | Hyde, Jr. ..................... | 705/45 |
| 6,045,039 | A * | 4/2000 | Stinson et al. .............. | 235/379 |
| 6,078,902 | A * | 6/2000 | Schenkler .................... | 705/35 |
| 6,105,011 | A * | 8/2000 | Morrison, Jr. ................ | 705/45 |
| 6,145,738 | A * | 11/2000 | Stinson et al. .............. | 235/379 |
| 6,164,528 | A * | 12/2000 | Hills et al. .................. | 235/379 |
| 6,175,824 | B1 * | 1/2001 | Breitzman et al. ............ | 705/36 |
| 6,243,689 | B1 * | 6/2001 | Norton ......................... | 705/18 |
| 6,269,348 | B1 * | 7/2001 | Pare, Jr. et al. ................ | 705/39 |
| 6,289,319 | B1 * | 9/2001 | Lockwood .................... | 705/35 |
| 6,317,745 | B1 * | 11/2001 | Thomas et al. .............. | 707/100 |
| 6,424,949 | B1 * | 7/2002 | Deaton et al. ................. | 705/14 |
| 6,464,134 | B1 * | 10/2002 | Page .......................... | 235/379 |
| 6,606,606 | B2 * | 8/2003 | Starr ....................... | 705/36 R |
| 6,796,492 | B1 * | 9/2004 | Gatto ........................ | 235/379 |
| 6,853,987 | B1 * | 2/2005 | Cook .......................... | 705/75 |
| 7,103,570 | B1 * | 9/2006 | Morea et al. ................. | 705/38 |
| 7,318,047 | B1 * | 1/2008 | Foth et al. ..................... | 705/39 |
| 7,349,557 | B2 * | 3/2008 | Tibor ......................... | 382/115 |
| 2002/0073019 | A1 * | 6/2002 | Deaton ........................ | 705/38 |

OTHER PUBLICATIONS

Jalinna Jones, "TeleCheck introduces in-store check processor", Business Wire; New York, Jun. 27, 1996, two pages.*

Anonymous, "Custom-designing a new solution", Chain Store Age Executive with Shopping Center Age; New York, Sep. 1994, three pages.*

* cited by examiner

Primary Examiner—Andrew Joseph Rudy
(74) Attorney, Agent, or Firm—Sutherland Asbill & Brennan LLP

(57) ABSTRACT

The invention involves a system and a method of determining collectability of a check writer from a database including negative information of a plurality of check writers for check writing approval or denial. The invention provides for an improvement of determining collectability of a check writer in order to more effectively distinguish between collectible check writers and non-collectible check writers. The invention includes receiving the information of the check writer, processing the information to determine a score of the check writer, classifying the check writer within a predetermined category, and removing or retaining the check writer information from the database, depending on the category within which the check writer is classified.

8 Claims, 1 Drawing Sheet

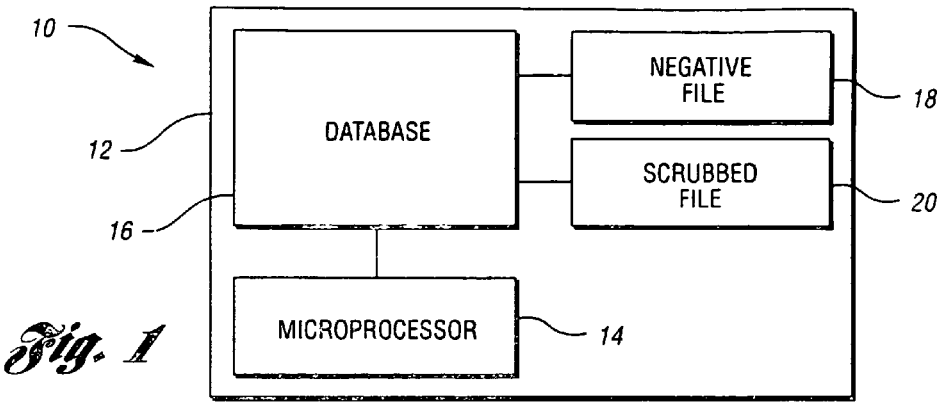
*Fig. 1*
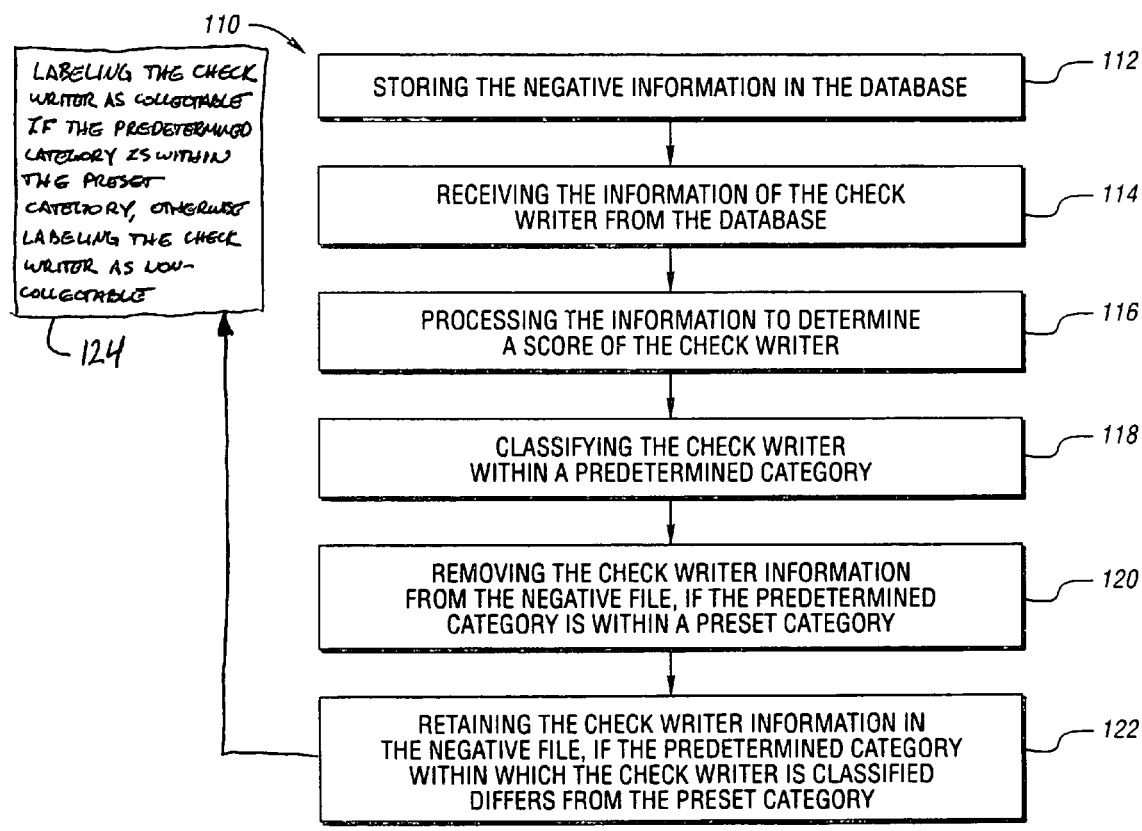
*Fig. 2*
*Fig. 3*
| RISK SCORE | CATEGORY |
|---|---|
| 0-100 | NON-COLLECTIBLE |
| 101-400 | COLLECTIBLE |

SYSTEM AND METHOD OF DETERMINING COLLECTABILITY IN A DISTRIBUTED NEGATIVE FILE

TECHNICAL FIELD

The present invention relates to a system and method of determining collectability of a check writer from a database including information of the check writer for check writing approval or denial.

BACKGROUND ART

The use of check writing and cashing has grown ever so common. The continuous increase in the transmission of information has lowered the need to constantly carry cash and has, in effect, heightened the use of writing and cashing checks, providing an easy way for a customer or check writer to make a purchase without visiting a bank or an electronic teller.

Likewise, with the wide use of checks, merchants have a growing need to determine the collectability of checks in order to approve or deny checks written. Merchants, e.g., grocers, face a daily challenge of dealing with two competing interests. Grocers have an interest of taking care of their customers whom are shopping for essentials of living, e.g., food. Grocers also have an interest of protecting themselves from negative or fraudulent check writers.

Merchants have an interest of keeping their valued customers satisfied. For example, grocers are in the business in which the majority of the same customers typically return on a continual basis, e.g., weekly. Most of the customers are local residents. Generally, such customers are "good" customers who write checks that typically clear at the bank.

Even at times when occasionally such customers write checks that are returned to the merchant for insufficient funds, the funds are typically collected at a date shortly thereafter. In this way, merchants are cooperative and accommodating to such customers whom may have written an occasional check that has been returned for insufficient funds. One reason is that merchants realize that some of their customers may not at the time have the funds to purchase, for example, food, an obvious essential part of living. Merchants also realize that at a date shortly thereafter, such customers more than likely will have the funds to clear their checks. Thus, merchants refer to these types of customers as collectible customers.

As stated above, merchants also have the interest in protecting themselves from negative and fraudulent check writers writing checks that more than likely will be returned for insufficient funds. Such "bad" or fraudulent check writers typically write checks that are not collectible. Thus, merchants refer to these types of customers are non-collectible customers. Merchants continually pursue ways which effectively distinguish collectible from non-collectible customers.

Current systems implemented to perform check and customer approval are adequate; however, current systems may be improved. One current system generally includes a computer database having a distributed negative file containing names and/or identification of check writers whom have been labeled as "negative check writers" based on historical check writing information. The distributed negative file typically is provided by check acceptance companies such as TeleCheck Services, Inc. Typically, merchants use the distributed negative file as needed for check verification purposes.

The distributed negative files are created to allow the merchant to determine whether to approve or deny a check from a check writer. The distributed negative file is created, for example, by TeleCheck, through a check/check writer analysis prior to a transaction. The distributed negative file is a file including names of a plurality of check writers whom have historical negative information known to check acceptance companies. For example, the distributed negative file may include names of check writers having returned checks or outstanding check debt.

In use, the distributed negative file is configured in a computer database which may be locally disposed within a store of the merchant. Cashier stations may then access via computer line the distributed negative file as needed. Typically, a cashier simply types in or swipes a check through in order to access the distributed negative file. If the customer's name, bank account number, or identification is included within the distributed negative file, then the customer is typically denied.

However, because the distributed negative file typically includes all negative historical check writing information of a plurality of check writers, some "good" customers may be denied from writing checks. This is undesirable for the merchant and especially for the "good" customer. The merchant loses a purchase which more than likely would have been collected shortly thereafter, and the customer is obviously not allowed to write a check. Additionally, the merchant may suffer a loss of business from that particular customer, due to this incident. Thus, this is undesirable.

What is needed is an improved system for determining the collectability of a check writer such that collectible customers may be distinguished from non-collectible or least collectible customers.

What is also needed is an improved system for determining collectability of a check writer from a database including information of the check writer for check writing approval or denial.

DISCLOSURE OF INVENTION

Accordingly, it is an object of the present invention to provide an improved system and method of determining collectability of a check writer from a database including information of the check writer for check writing approval or denial.

It is a further object of the present invention to provide an improved system and method of determining collectability of a check writer from a database such that collectible customers may be distinguished from non-collectable customers.

A more specific object of this invention is a method of determining collectability of a check writer from a database including historical negative information of the check writer for check writing approval or denial. The method includes receiving the negative information of the check writer from the database, processing the information to determine a risk score of the check writer based on the information, and classifying the check writer within a predetermined category based on the risk score. The method further includes removing the check writer information from the database and labeling the check writer as collectible, if the predetermined category within which the check writer is classified is within a preset category. The method further includes retaining the check writer information in the database and labeling the check writer as non-collectable, if the predetermined category within which the check writer is classified defers from the preset category.

Another specific object of this invention is a system for determining collectability of a check writer from a database including historical negative information of the check writer for check writing approval or denial. The system includes a first mechanism for receiving the negative information of the check writer from the database, a second mechanism for processing the information to determine a score of the check writer based on the information, and a third mechanism for classifying the check writer within a predetermined category based on the score. The system further includes a fourth mechanism for removing the check writer information from the database and for labeling the check writer as collectible, if the predetermined category within which the check writer is classified is within a preset category. The fourth mechanism further retains the check writer information in the database and labels the check writer as non-collectible, if the predetermined category within which the check writer is classified differs from the preset category.

BRIEF DESCRIPTION OF DRAWINGS

FIG. 1 is a schematic view of an overall system for determining collectability in accordance with one embodiment of the present invention;

FIG. 2 is a flow chart illustrating one method of determining collectability of a check writer provided by the present invention in accordance with the system of FIG. 1; and FIG. 3 is a view of a table illustrating categories within which a check writer is classified in accordance with one embodiment of the present invention.

BEST MODE FOR CARRYING OUT THE INVENTION

FIG. 1 schematically illustrates a system 10 of the present invention used for determining collectability of a check writer from a database including negative information of the check writer for check writing approval or denial. As shown in FIG. 1, system 10 includes a host computer 12 having a microprocessor 14 and a database 16. Database 16 includes distributed negative file 18 and scrubbed file 20. Microprocessor 14 is in communication with database 16.

As stated above, host 12 includes microprocessor 14 and database 16. Database 16 provides a mechanism for storing negative information of a plurality of check writers. Database 16 may be any type of suitable medium in which the information may be stored. For example, database 16 may be a disk drive and a control or a plurality of disk drives and controls having the trade name STORAGEWORKS™ manufactured by Digital Equipment Corporation and having a storage capacity of nine gigabytes.

Microprocessor 14 provides a mechanism for receiving the negative information of the plurality of check writers from database 16, processing the information to determine a risk score or factors of each check writer based on the respective negative information, and classifying the check writer within a predetermined category based on the risk score. Additionally, microprocessor 14 provides a mechanism for removing each check writer information from the database and labeling the check writer as "collectible", if the predetermined category within which the check writer is classified is within a preset category. Microprocessor 14 also provides a mechanism for retaining the check writer information in the database and labeling the check writer as "non-collectible" or "least collectible," if the predetermined category within which the check writer is classified differs from the preset category.

Microprocessor 14 may be any suitable processor which is capable of fulfilling the functions of receiving the information of the check writer, processing the information to determine a risk score, classifying the check writer within a predetermined category, and removing or retaining the check writer information based on the predetermined category within which the check writer is classified. For example, microprocessor 14 may be a processor having the trade name AXP™ manufactured by Digital Equipment Corporation, having 600-650 MHZ of speed and any suitable amount of memory. Moreover, a plurality of processors may be used.

FIG. 2 illustrates an example of a method of the present invention in accordance with system 10 of FIG. 1. In this embodiment, microprocessor 14 is configured to store the negative information of the plurality of check writers in distributed negative file 18 of database 16 in 112. The negative information includes information of the plurality of check writers indicative of their collectability. For example, for each check writer, the negative information may include number of checks returned to merchants for insufficient funds, credit rating, etc. Preferably, microprocessor 14 receives the information of each check writer from distributed negative file 18 and processes the information to determine a risk score of the respective check writer.

More specifically, the risk score for the check writer is based on the respective negative information of the check writer and is determined through a risk analysis program configured in microprocessor 14. For example, through the program, microprocessor 14 accesses the respective information of the check writer from database 16. In this embodiment, the program may have a number of parameters, each of which represent historical negative information accessed from negative file 18 of database 16. The parameters may be incorporated within calculations in order to determine a sub-score for each parameter. In this embodiment, the sub-scores are then added to determine the risk score of the check writer. The sub-scores for the parameters may be determined by using different calculations based on a predetermined importance of each parameter. However, it is to be noted that other determinations of the risk score do not fall beyond the scope and spirit of this invention.

For example, microprocessor 14 may be configured to weigh the number of checks returned to merchants for insufficient funds with the most importance. In this situation, the importance placed on the parameter indicative of the number of returned checks for insufficient funds may be mathematically represented in the calculations, providing greater affect on the risk score than other parameters. Depending on a point of reference, the analysis may be affected by having a higher or lower value.

Microprocessor 14 then classifies the check writer information within a predetermined category based on the risk score or factors. As shown in FIG. 3, the predetermined category within which the check writer information is classified may be a range of a table having a plurality of ranges of possible risk scores. In this embodiment, the range or predetermined category in which the risk score of the check writer information falls, determines a pre-set category within which the check writer is classified. For example, as shown in FIG. 3, a risk score of 50 falls in a range or predetermined category between "0-100" risk scores. Thus, such risk score is labeled non-collectible, a pre-set category. In this embodiment, a higher risk score provides a more favorable analysis for the check writer. Thus, a risk score of 350 labels the check writer as a collectible customer. On the contrary, a risk score of 100 or lower labels the respective check writer as a non-collectible customer.

Microprocessor 14 then removes the check writer information from negative file 18, if the predetermined category within which the check writer is classified is within the preset category. If the predetermined category within which the check writer is classified differs from the preset category, then microprocessor 14 retains the check writer information in negative file 18. Microprocessor 14 may retain the information by identification data, e.g., name, social security number, drivers license number or any other suitable data used to identify the check writer. For example, if the check writer information has a risk score that falls within 101-400, microprocessor 14 labels the check writer as a collectible customer, then the check writer information is removed from negative file 18. Negative file 18, having removed and retained information, may then be saved as scrubbed file 20. Being removed from negative file 18, the check writer information will not be found within a merchant accesses scrubbed file 20. Thus, the respective check writer will more than likely be approved by the merchant. Otherwise, the respective check writer information would have been accessed from scrubbed file 20 with the respective identification data, more than likely resulting in a denial to the check writer.

On the contrary, for example, if the check writer information has a risk score that falls between 0-100, microprocessor 14 labels the check writer as a non-collectible customer, then the information of the check writer is retained within scrubbed file 20. As a result, when a merchant accesses a scrubbed distributed negative file, the check writer information will be accessed, more than likely resulting in a denial to the check writer.

In use, scrubbed file 20 is simply copied and sent to the merchant for implementation. For example, scrubbed file 20 may be any file compatible with a computer system used for check verification. Scrubbed file also may be a hard copy of information including "non-collectible" or "least collectible" check writers. Scrubbed file 20 may be updated periodically as needed.

For example, as similarly stated above, scrubbed file 20 or a copy thereof may be configured in a computer system which may be locally disposed within a store of the merchant. Cashier stations may then access via computer line scrubbed file 20, as needed. A cashier would simply type in or swipe a check through in order to access scrubbed file 20 or a copy thereof. If the customer's name, bank account number or identification is included-within scrubbed file 20, then the customer is typically denied.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising executing computer implemented instructions performed by one or more processors for determining the collectability of check writers, the method comprising:

storing a negative file in a database, the negative file including negative information about each check writer of a plurality of check writers;

classifying, via at least one processor, each check writer into one of a plurality of categories associated with a score based at least in part on the number of checks returned to merchants for insufficient funds;

modifying, via at least one processor, the negative file by removing the negative information for each check writer classified within a pre-determined set of the categories and retaining the negative information for each check writer not classified with the pre-determined set of categories;

labeling, via at least one processor, each check writer classified within the pre-determined set of categories as collectible and labeling each check writer not classified within the predetermined set of categories as non-collectible; and transmitting the modified negative file to at least one merchant for use in check verification at a merchant location, wherein the modified negative file is accessed to determine check writer information.

2. The method of claim 1 wherein classifying each check writer into one of the plurality of categories comprises:

receiving the negative information from the negative file;

processing the negative information to determine a score for each check writer based on the negative information; and classifying each check writer into one of the plurality of categories based on the score of the check writer.

3. The method of claim 2 further comprising saving the modified negative file as a scrubbed file.

4. A method for determining the collectability of a check writer, the method comprising:

receiving negative information about the check writer from a database;

processing the negative information to determine a score, wherein the score is based at least in part on the number of checks returned to merchants for insufficient funds;

classifying the check writer within one of a plurality of categories based on the score;

removing the negative information from the database if the category into which the check writer is classified is one of a predetermined set of categories; and transmitting a scrubbed negative file from the database to at least one merchant for use in check verification at a merchant location, wherein the modified negative file is accessed to determine check writer information.

5. The method of claim 4 further comprising saving the negative information in a scrubbed filed if the category into which the check writer is classified is not one of the pre-determined set of categories.

6. A system for determining the collectability of check writers, the system comprising:

a database containing a negative file, the negative file including negative information of a plurality of check writers; and a processor in communication with the database, the processor operative to:

(a) classify individual check writers of the plurality of check writers as one of a plurality of pre-determined categories associated with a score based at least in part on the number of checks returned to merchants for insufficient funds, (b) modify the negative file by removing the negative information of the individual check writers classified within a pre-determined set of the plurality of pre-determined categories and retaining the negative information of the individual check writers not classified within the pre-determined set of the plurality of pre-determined categories, (c) label the individual check writers classified within a pre-determined set of the plurality of pre-determined categories as collectible and labeling the individual check writers not classified within the pre-determined set of the plurality of pre-determined categories as non-collectible, and (d) transmit the modified negative file to at least one merchant for use in check verification at a merchant location, wherein the modified negative file is accessed to determine check writer information.

7. The system of claim 6, the processor further configured to:
receive the negative information of the individual check writers from the negative file;
determine scores of the individual check writers based on the negative information; and
classify the individual check writers as one of the plurality of pre-determined categories based on the scores of the individual check writers.

8. The system of claim 7, wherein the processor is further configured to save the modified negative file as a scrubbed file.

* * * * *